United States Patent
Reese

[11] 3,988,000
[45] Oct. 26, 1976

[54] SEALS FOR A GAS SERVICE BUTTERFLY VALVE
[75] Inventor: Anthony L. Reese, Bradford, Pa.
[73] Assignee: Dresser Industries, Inc., Dallas, Tex.
[22] Filed: Apr. 7, 1975
[21] Appl. No.: 565,512

[52] U.S. Cl.............................. 251/214; 251/305; 277/103
[51] Int. Cl.² ..................... F16K 31/44; F16K 1/22
[58] Field of Search .......... 251/214, 248, 304, 305, 251/306, 307, 308, 355; 137/246, 22; 277/59, 103, 115, 117, 121, 190

[56] References Cited
UNITED STATES PATENTS

| | | | |
|---|---|---|---|
| 2,306,219 | 12/1942 | McMangus | 277/103 |
| 3,076,658 | 2/1963 | LeMan | 277/121 |
| 3,091,470 | 5/1963 | Anderson et al. | 277/103 |
| 3,190,702 | 6/1965 | Flick | 277/205 |
| 3,384,382 | 5/1968 | Rink | 277/205 |
| 3,471,121 | 10/1969 | Geiselman | 251/308 |
| 3,525,499 | 8/1970 | Geiselman et al. | 251/306 |

FOREIGN PATENTS OR APPLICATIONS
133,883 6/1929 Switzerland......................... 277/103

Primary Examiner—Martin P. Schwadron
Assistant Examiner—G. L. Walton
Attorney, Agent, or Firm—Daniel Rubin

[57] ABSTRACT

A mechanically packed gasket is supported circularly concentric on the operator shaft of a butterfly valve in a wedged interfit with an inwardly chamfered end of the shaft journal. With gasket pressure of magnitudes greater than line pressure, leakage of gas from the valve passage past the actuator is prevented. At the same time, gasket pressure against the operator shaft prevents leakage to atmosphere of any gas content inadvertently obtaining access to the shaft surface either by leakage into the vane cavity through porosity of the vane or through functional failure of other shaft seals. Located outward of the shaft journal in a leakage path parallel to that of the gasket is a lubricant packing construction enabling in-service maintenance to be performed against the journal in the event line content leakage should be encountered there.

9 Claims, 10 Drawing Figures (a)

(b)

(a)

(b)

SEALS FOR A GAS SERVICE BUTTERFLY VALVE

BACKGROUND OF THE INVENTION

1. The field of art to which the invention pertains comprises the art of valves including seals and packing therefor.

2. The prior art to which the invention is directed includes the art of valves and particularly butterfly valves being a type in which a usually circular closure vane or disc is mounted either centralized or offset for rotation in the body flow passage between an open and closed position. Construction for such valves commonly consists of a body and/or closure vane of cast iron or the like operable by means of an operator shaft extending through a bore in the body wall to externally thereof.

Normally supporting the operator shaft is a sleeve-like journal suitably packed to prevent leakage of line content from the flow passage past the journal to atmosphere. A self-packing seal is frequently supported on the shaft intermediate the vane and journal for preventing leakage of line content therepast. While this combination of components is known to perform well for service applications such as water distribution, it has not been found suitable in application for gas service or the like. Not only is substantially higher gasket pressure required to prevent gas leakage from the valve passage than is generally possible with a self-sealing type gasket, but internal leakage from secondary sources is a significantly greater problem with gas than with water. The source of secondary leakage has only recently been identified with porosity of the vane and/or functional failure of the shaft seals enabling pressurized line content access to the shaft surface either through the vane cavity or past a non-functioning seal located elsewhere. In either situation, the gas tends to travel internally of the vane along the shaft internally of the journal through the operator to atmosphere.

Because of the possible combustible nature of the gas line content, sealing against leakage in any form is critical. Despite recognition of the problem, solutions heretofore have included a variety of self-sealing gaskets to prevent leakage and porosity testing each vane under pressure and/or other testing to insure against secondary leakage. As might be expected, neither has proven satisfactory because of the general unreliability of the self-sealing gasket and the high expense which such tests incur, not to mention the high scrap cost attributed to those vanes rejected by the test.

SUMMARY OF THE INVENTION

The invention relates to valves and more particularly to improvements in butterfly valves intended for gas line service at gas pressures on the order of ¼0 to 175 psig. In accordance with the construction hereof, the previous problem of line leakage and/or secondary leakage along the surface of the operator shaft is eliminated by use of a gasket supported on the actuator shaft mechanically packed intermediate the vane and shaft support journal. To obtain the high level of sealing pressure required for gas service, the gasket is supported circularly concentric in an annular formation on the shaft and includes a tapered end wedged in tandem engagement against an inwardly chamfered end face of the interlocking shaft journal. At the same time, by constructing the shaft journal capable of being packed under pressure, inservice maintenance can be performed to prevent leakage thereat as might otherwise occur from journal seal wear. Not only do these features enhance the operating reliability for such valves, but they do so at a substantial saving in manufacturing costs by eliminating the previously required testing procedures and rejects associated with similar purpose solutions of the prior art.

It is therefore an object of the invention to provide improved seals against gas leakage in a gas service butterfly valve.

It is another object of the invention to provide a novel sealing construction for a butterfly valve able to eliminate secondary leakage occurring along the operator shaft.

It is a further object of the invention to provide a novel packing construction for a butterfly valve enabling in-service packing of the shaft journal.

It is a still further object of the invention to effect the foregoing objects with relatively simple uncostly constructions which enhance rather than detract from the cost of manufacturing such valves.

Figure 1:
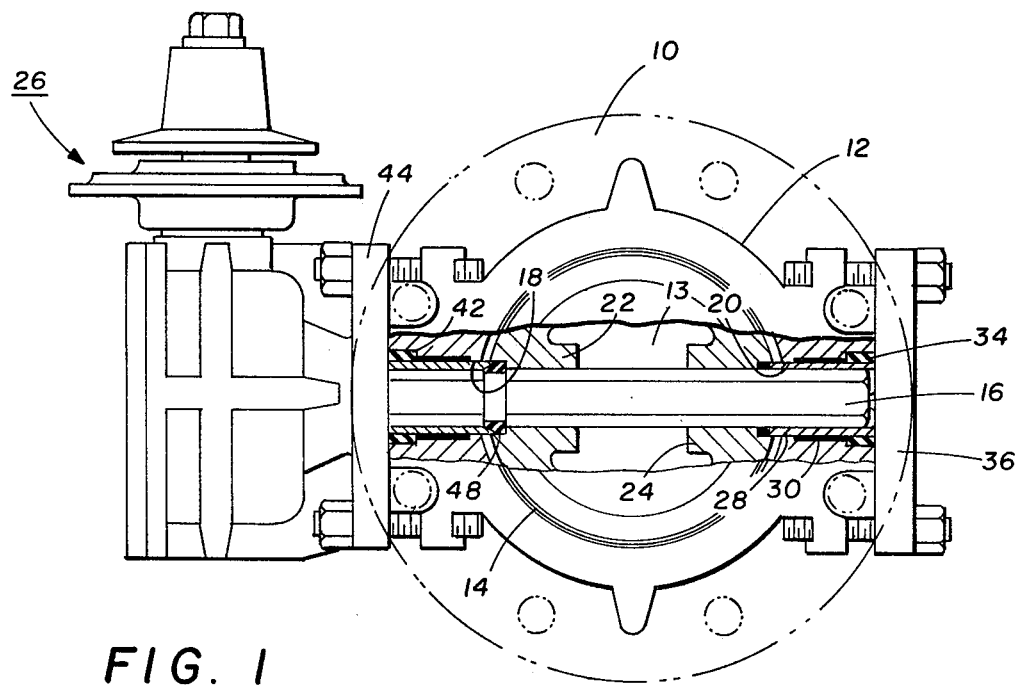
FIG. 1 is a plan view partially sectioned of a butterfly valve in accordance herewith.

Referring now to the drawings, there is illustrated a wafer-type butterfly valve formed of a cast iron ring-like body 10 defining a central flow passage which is opened and closed by means of a closure vane 12. The vane is hollow of cast iron or the like as to define an internal cavity 13, having internally extending vane bosses 22 and 24. For supporting the vane for rotation, bosses 22 and 24 are adapted to receive a hexagonal shaft 16 extending between oppositely positioned, axially aligned body bores 18 and 20 considered as the "top" and "bottom" bores respectively. Rotation of shaft 16 is effected via an operator 26 actuating shaft 16 in a well known manner whereby a resilient seal 14 on the vane circumference cooperates with an annular seat (not shown) in the passage for effecting a leak-tight passage closure. Surrounding and rotatably interlocking with shaft 16 in bottom bore 20 for supporting the shaft thereat is an elongated journal 28 in turn surrounded by an anti-friction bearing sleeve 30. A pair of resilient gasket seals 32 and 34 function maintain a leak-tight relation thereabout with the latter being a three lobe seal of tandem O-rings or the like contained by end cover 36. For reasons as will be understood, any failure of seal 32 from dirt, wear or improper installation can produce a source of secondary leakage of line content along shaft 16.

For sealing against the possibility of leakage either directly from the central flow passage or from secondary leakage along the operator shaft, shaft 16 is supported in top bore 18 via an elongated rotatably interlocking journal 38 having an inward end face 39 merging with an inwardly extending annular chamfer 41. Journal 38, in turn, is surrounded by an anti-friction bearing sleeve 40 held in place by an annular, resilient three lobe seal 42 likewise formed of tandem O-rings and contained by an operator base 44. Secured circularly concentric about hex shaft 16 in an annular shaft recess 43 mechanically packed between the inward end of journal 38 and a radial shoulder 46 on vane 12 is a gasket 48 in accordance herewith.

Figure 6:
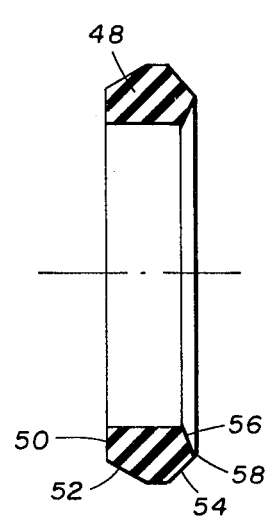
FIG. 6 is a sectional view of the gasket.
Figure 4:
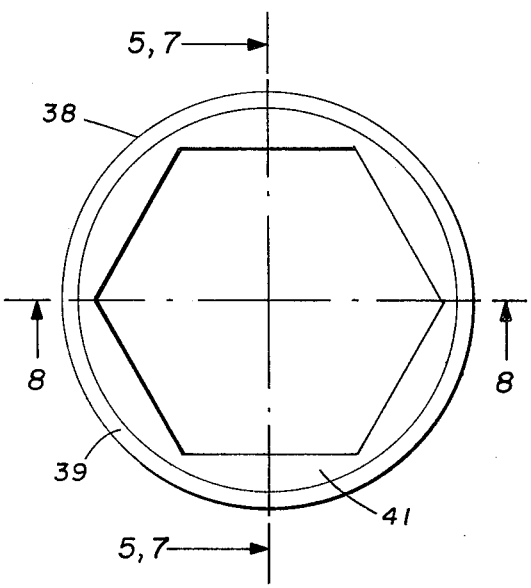
FIG. 4 is an end view of the shaft support journal.
Figure 7:
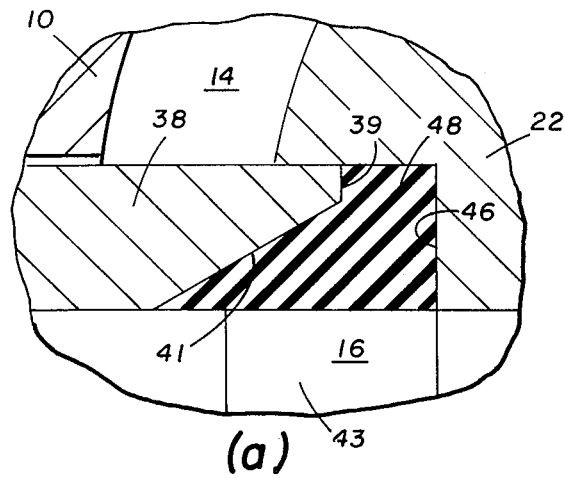
FIGS. 7a and b are fragmentary sectional enlargements of the encircled portion of FIG. 3 taken along the lines 7—7 of FIG. 4 for maximum and minimum gasket packing, respectively.
Figure 7:
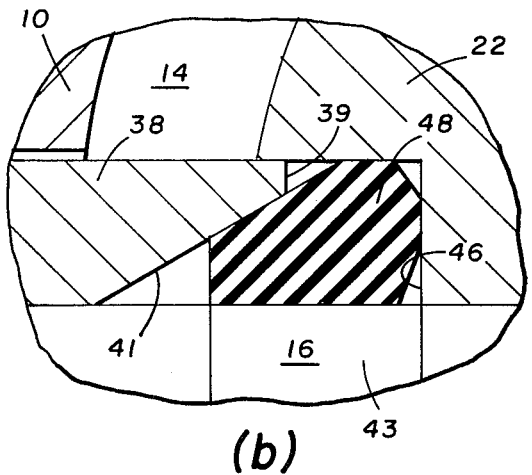
Figure 8:
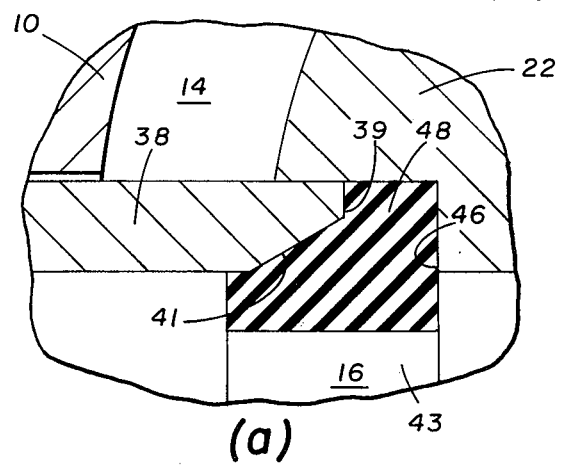
FIGS. 8a and b are fragmentary sectional enlargements of the encircled portion of FIG. 2 taken along the lines 8—8 of FIG. 4 for maximum and minimum gasket packing, respectively.
Figure 8:
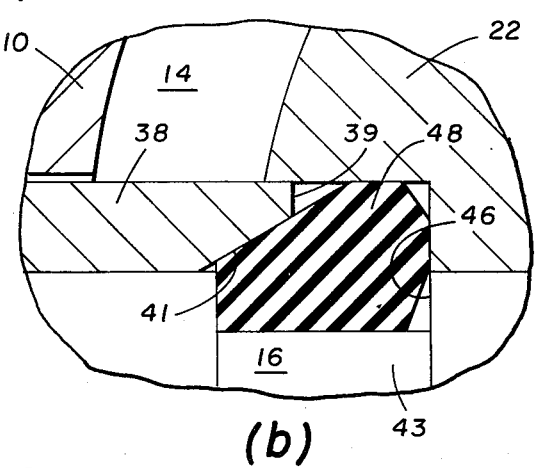

Gasket 48, as best seen in FIG. 6, is annular on both its inside and outside diameters and comprises a resilient composition of Buna N or other suitable material compatible with the gas line content with which it is to be utilized. In cross section, the gasket is shaped with a radial flat face 50 and for wedged engagement against journal chamfer 41 is itself chamfered or tapered along periphery 52. On the other hand, peripheral chamfer 54, in cooperation with inward chamfer 56, forms an annular axially extending crest or rib 58 adapted to seat against vane shoulder 46. The in-service configuration to be assumed by gasket 48 in this arrangement will be dictated by dimensional tolerances of the axial components somewhat between the maximum and minimum extremes (a) and (b), respectively, of FIGS. 7 and 8 viewed respectively across the flats and corners of journal 38.

Figure 2:
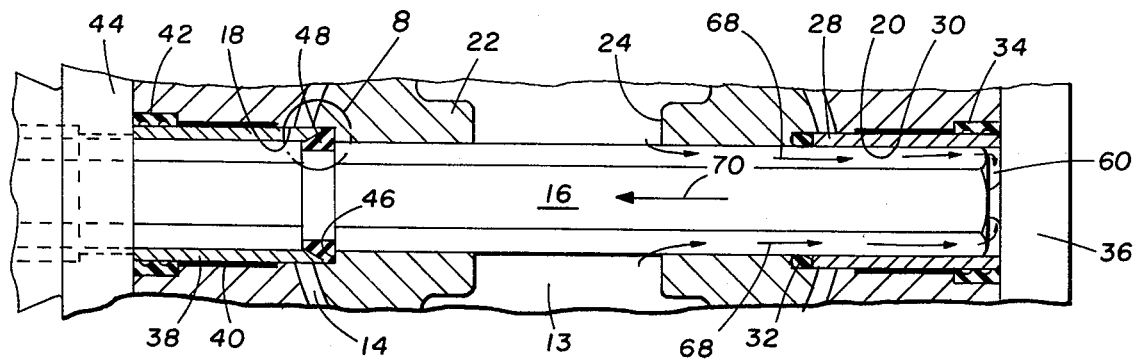
FIG. 2 is an enlarged fragmentary section of the vane to shaft connection for the valve of FIG. 1.
Figure 3:
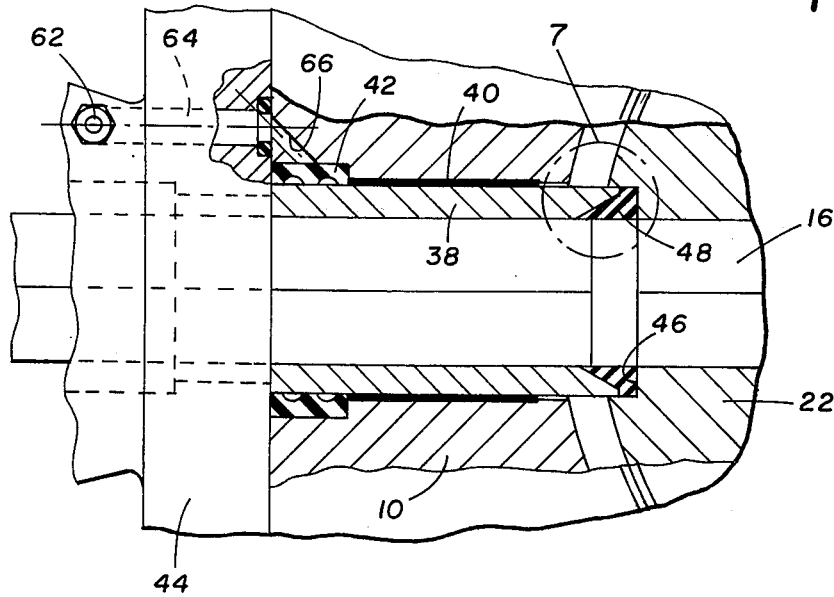
FIG. 3 is a further fragmentary sectional enlargement of the vane to shaft connection rotatably displaced about 60° from the section of FIG. 2.
Figure 5:
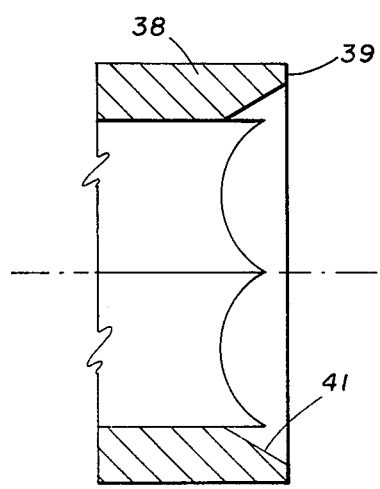
FIG. 5 is a fragmentary end section viewed substantially along the lines 5—5 of FIG. 4.

In operation, gasket 48 is compression packed at all times in a wedged interfit on shaft 16 between journal 38 and vane 22. Being packed in this manner, gasket pressure is unaffected by and is at least several orders of magnitude higher than line pressure of the valve. Any attempt at leakage from the valve passage toward shaft 16 is successfully thwarted by the seal effected between gasket 48 and the engaging surfaces of journal and/or vane. Should line content enter vane cavity 13 by whatever means or leak past gasket 32, it will tend to travel from the cavity along shaft 16 in the direction illustrated by the arrows 68 in FIG. 2. On reaching the right-most or bottom end of shaft 16 (as viewed in FIG. 2) a pressure pocket 60 is formed between the shaft end face and the inside face of cover plate 36 thereat. By virtue of pressure buildup in pocket 60 shaft 16 reacts in piston fashion by movement leftward, as indicated by arrow 70, until forcing gasket 48 increasingly inward of journal chamfer 41. With the latter occurring, the configuration of gasket 48 is increasingly altered toward the maximum compression of FIGS. 7(a) and 8(a). As a result of the increased gasket compression in response to the effects of pressure pocket 60, the radial sealing force thereat against recess 43 is further increased to further increase the compression seal between shoulder 46, chamfer 41 and shaft 16 unaffected by rotation of the shaft. Because of the enhanced sealing which the secondary leakage per se elsewhere contributes to gasket 48, any leakage along shaft 16 past gasket 48 to outward through operator 26 is thereby precluded in a reliable and positive manner.

Should three lobe gasket 42 ultimately fail to perform in the manner intended by virtue of aging, wear or other factors which deleteriously affect such gasket compositions over the years, there is provided an in-service back up enabling a lubricant packing thereof. This is achieved by means of a construction which enables repacking of gasket 42 in service and under pressure through a grease fitting 62 communicating with an aperture 64 drilled through end plate 44. At that point, aperture 64 communicates with an aperture 66 in turn communicating with the annular cavity containing seal 42. The effect of the added lubricant against the backside of the seal is to increase its sealing force to a level able to readily contain any leakage thereat.

By the above description there is described a novel construction for a gas service butterfly valve able to effectively eliminate either primary gas leakage from the valve passage or secondary leakage as might otherwise result along the operator shaft. By virtue of a wedged interfit effecting a compression seal between the journal, vane, shaft and gasket supported circularly concentric about the vane shaft downstream of the vane, leakage is precluded in a positive and effective manner as to overcome the previous difficulties of using a butterfly valve in gas service and eliminate the high cost of testing and rejects associated with the similar purpose solutions of secondary leakage in the prior art. By virtue of the simple and effective gasket arrangement, coupled with a separably effected lubricant packable journal construction such valves are rendered increasingly safe against leakage without the attendant costs previously encountered in the construction of said valves.

Since many changes could be made in the above construction and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a butterfly valve including a body defining a fluid passage between an inlet and an outlet, a bore defined in said body extending from said passage to outward of said body, an operator at the outward end of said body bore, a rotatable vane in said passage, a rotatable operator shaft extending through said bore from a connection with said operator for supporting and operating said vane between open and closed positions of said passage, and a journal supporting said shaft for rotation in said bore, an annular groove formed in said shaft at a location axially intermediate said journal and said vane, annular seal means contained in said groove and an annular chamfer in the groove facing end of said journal for said seal means to be mechanically compressed in a wedged interfit between said journal and the vane surface thereat to prevent pressurized line content from escaping past said shaft and said journal to externally of said body.

2. In a butterfly valve according to claim 1 including a journal seal in said bore surrounding said journal and packing means operative to pack said journal seal in service from externally of said body.

3. In a butterfly valve according to claim 1 in which said seal means operatively effects a sealing pressure of magnitudes greater than the line pressure contemplated for the valve.

4. In a butterfly valve according to claim 3 in which said seal means comprises a resilient composition mechanically compressed in a wedged interfit with the camfer of said journal.

5. In a butterfly valve according to claim 4 in which the external shape of said shaft and the internal shape of said journal are of a mating polygonal configuration to effect a rotational interlock therebetween.

6. In a butterfly valve according to claim 5 in which said seal means includes an annular chamfer for cooperating with said journal chamfer in effecting said wedged interfit.

7. In a butterfly valve according to claim 6 in which said vane is internally hollow, said operator shaft extends through a wall of said vane into the hollow portion thereof and said seal means is effective for preventing said escape of line content that reaches said shaft internally of said vane.

8. In a butterfly valve according to claim 7 in which said body includes a second bore defined in said body extending from said passage at a location opposite to and axially aligned with said first bore to outward of said body, said shaft extends through said vane from said first bore into said second bore, there is included a second journal in said second bore that with said first journal supports said shaft for rotation and a gasket supported on said shaft between the vane and facing end of the second journal thereat operatively intended to seal line content in said passage from reaching said shaft, and said seal means is effective for preventing escape of line content that reaches said shaft from failure of said gasket.

9. In a butterfly valve according to claim 8 in which said operator shaft is longitudinally displaceable in response to line content reaching it for enhancing the sealing pressure effected by said seal means.

* * * * *